June 17, 1958     J. O. SIRIA     2,839,097
CHAIN SAW ATTACHMENT FOR PORTABLE CIRCULAR SAW
Filed May 7, 1956
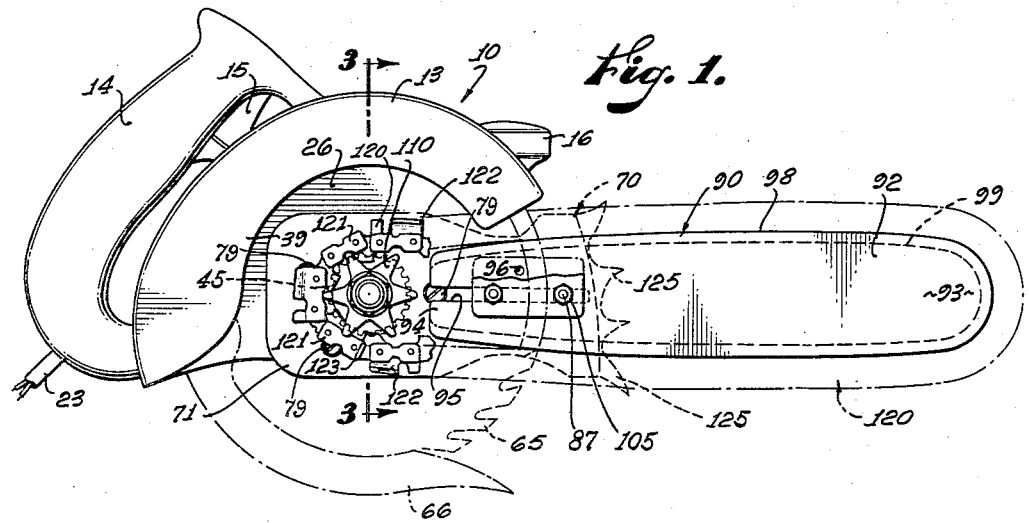
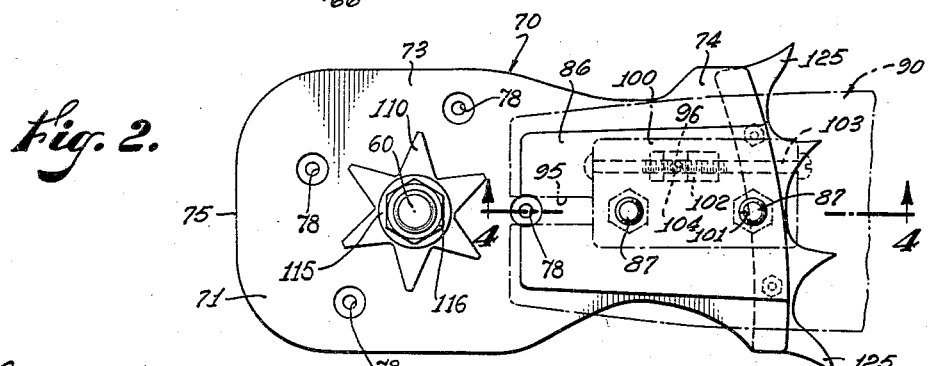
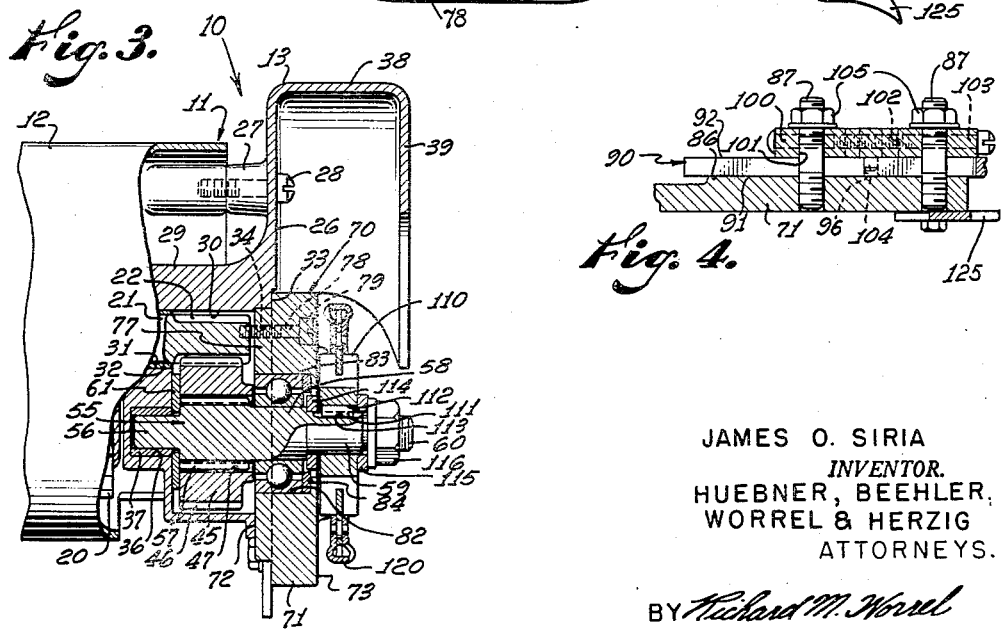
JAMES O. SIRIA
*INVENTOR.*
HUEBNER, BEEHLER,
WORREL & HERZIG
ATTORNEYS.
BY

United States Patent Office 2,839,097
Patented June 17, 1958

2,839,097

CHAIN SAW ATTACHMENT FOR PORTABLE CIRCULAR SAW

James O. Siria, Fresno, Calif., assignor, by direct and mesne assignments, of one-third each to Edward C. Mosesian, Newton J. Caffejian, and Charles J. Vagim, as copartners, doing business as Cenatron Industries, Fresno, Calif.

Application May 7, 1956, Serial No. 583,148

5 Claims. (Cl. 143—32)

The present invention relates to portable, mechanically driven, hand saws and more particularly to a conversion attachment for mounting saw chains on a circular saw in lieu of the circular saw blades thereof.

There are numerous types of circular saws which are portable, electrically driven, and which are held in the hand during operation. A conventional circular saw generally consists of a housing having a handle connected thereto and enclosing a small electrical motor which provides an output shaft. A circular saw blade generally of from six to ten inches in diameter is mounted on a shaft and the latter is extended into the housing in driven engagement with the output shaft of the motor. The housing usually has a guard portion which partially encloses the saw blade as a safety measure.

Though not as common, there are also portable, electrically driven, hand held chain saws available. In appearance, these saws are similar to the circular saws except that chains having teeth connected thereto are mounted in driven connection to the motors therefor. Heretofore, satisfactory structures alternately useable as circular and chain saws have not been known, nor have acceptable conversion attachments for circular saws capable of readily adapting such saws for receipt of chain saw blades been available. Thus, it has been necessary to purchase two separate units if the advantages of each type of saw are to be realized.

Accordingly, it is an object of the present invention to provide an auxiliary attachment for releasably mounting saw chains on a circular saw in place of the circular saw blades thereof.

Another object is to provide a sawing apparatus adapted for use with either a circular saw blade or a saw chain.

Another object is to obviate the expense, inconvenience and burden of having to acquire both a chain saw and a circular saw in order to attain the advantages of each.

Another object is to adapt a circular saw for use with a saw chain so that the change from one type of saw to the other can be accomplished in a minimum of time and with a minimum of inconvenience.

Another object is to provide an attachment of the nature described which is adjustable to permit slackening or tightening of the saw chain.

Another object is to provide an attachment as described above which mounts a saw chain in such a manner that it may be quickly and easily removed for replacement and/or repair.

Other objects are to provide an attachment for mounting saw chains on circular saws which is simple and economical to make, adaptable to many types of portable, mechanical hand saws, and which is dependable, durable, and is highly effective for accomplishing its intended purposes.

These and other objects will become apparent upon reference to the drawing and following description.

In the drawing:

Fig. 1 is a side elevation of a chain saw having the attachment of the present invention mounted thereon and showing in dashed lines a circular saw blade and guard as normally employed with the circular saw.

Fig. 2 is a somewhat enlarged face view of the attachment of the present invention with a cutter bar of the attachment fragmentarily shown in dashed lines.

Fig. 3 is a somewhat enlarged fragmentary transverse section taken on line 3—3 of Fig. 1.

Fig. 4 is a longitudinal section taken on line 4—4 of Fig. 2.

Referring more particularly to the drawing, a portable, electric, hand manipulated circular saw 10 is shown in Fig. 1 which typifies many types of such saws which are presently available. The saw includes a housing 11 having a substantially cylindrical portion or wall 12 and an end portion 13 to be specifically described. A handle 14 is connected to the cylindrical portion of the housing and mounts a trigger switch 15 therein. For convenience in handling the saw during operation, a knob 16 is also connected to the housing and upwardly extended forwardly of the handle.

A small electric motor 20 is mounted within the cylindrical portion 12 of the housing 11 and has an output shaft 21 endwardly extended through an opening in the cylindrical portion which is partially enclosed by the end portion 13 of the housing. A cog or pinion gear 22 is formed on the end of the output shaft or, alternatively, may be rigidly secured in endward extension from the shaft. The motor is energized through a power cord 23 which is connected to the motor and extended through the housing and the handle 14 outwardly of the saw, as seen in Fig. 1. The trigger switch 15 is connected in series with the cord so that when the cord is connected to a source of voltage, the motor may be energized and de-energized by squeezing and releasing the trigger.

The end portion 13 of the housing 11 includes a flat mounting flange 26 of generally semicircular form as seen in Fig. 1. The mounting flange is held in substantially normal relation to the output shaft 21 by means of protuberances 27 inwardly extended therefrom and abutting the cylindrical portion 12 of the housing. Elongated bolts 28 are extended through the mounting flange and protuberances and screw-threadably received in the cylindrical portion of the housing.

The end portion 13 of the housing 11 also has an inwardly extended portion 29 having a substantially circular grease pocket 30 providing an opening receiving the output shaft 21 and cog 22 of the motor 20. A bearing 32 is concentrically positioned in the opening and journals the output shaft therein. A shoulder 33 is formed in circumscribing relation to the pocket and a plurality of threaded bores 34 are extended inwardly in the portion 29 from the shoulder in substantially parallel relation to the output shaft. The end portion 13 of the housing also has a cylindrical socket 36 eccentric to the output shaft, and a bearing 37 is frictionally fitted in the socket for a purpose to be described.

The end portion 13 of the housing 11 further has an arcuate substantially semicircular peripheral portion or intermediate flange 38 perpendicularly outwardly extended from the mounting flange 26 and an arcuate downwardly extended outer flange 39. The top and outer flanges of the housing together with the adjacent portion of the mounting flange form a saw guard, as will be seen.

A substantially cylindrical spur gear 45 is positioned in the grease pocket 30 and provides external gear teeth 46 in mesh with the cog 22 on the motor output shaft 21. The spur gear also has a central bore circumscribed by a plurality of internally grooved keyways 47 disposed axially of the gear.

An elongated drive shaft 55 provides a cylindrical inner end 56 rotatably fitted in the bearing 37, a plurality of longitudinally extended peripherally spaced keys 57 slidably received in the keyways 47 of the spur gear 45, a cylindrical bearing portion 58, a cylindrical mounting portion 59 of a diameter somewhat less than the bearing portion, and an outer threaded end 60. A washer 61 is located on the inner end 56 of the shaft against the spur gear 45.

A circular saw blade 65 and an associated movable guard 66 are indicated in dashed lines in Fig. 1. This saw blade is normally mounted on the drive shaft 55 or one similar thereto, for rotation with the shaft incident to energization of the motor 20.

The attachment of the present invention is generally indicated at 70 in Fig. 1 and is adapted to be connected to the circular saw 10 after the saw blade 65 has been removed. The attachment includes a generally rectangular mounting block 71 having inner and outer sides 72 and 73, and front and rear end portions 74 and 75. As best seen in Fig. 3, a substantially circular boss 77 is inwardly extended from the rear portion of the block and is frictionally fitted in the pocket 30 of the housing so that the shoulder 33 abuts the mounting block. The mounting block provides a plurality of apertures 78 adapted for alignment with the bores 34 in the housing, and elongated bolts 79 are extended through the apertures and screw-threadably received in the bores 34. When thus connected to the housing, the mounting block extends forwardly in substantially radial relation to the drive shaft 55, as is evident in Fig. 1.

The mounting block 71 provides an opening 82 concentric to the socket 36 in which is located a roller bearing 83 receiving the bearing portion 58 of the drive shaft 55 for rotation thereof relative to the mounting block. The block provides a ledge inwardly extended in circumscribing relation to the opening and a washer 84 is interposed the bearing 83 and the ledge. It is to be noted that the mounting portion 59 and the threaded end 60 of the drive shaft extend outwardly of the mounting block.

The mounting block 71 further provides a spacing means in the form of an outer boss 86 laterally extended from the front portion 74 as best shown in Figs. 2 and 4. A pair of elongated threaded studs 87 provide inner ends rigidly secured to the outer boss and are outwardly extended from the mounting block in substantially normal relation thereto. The studs are in spaced parallel relation and are in a substantially common plane with the drive shaft when the mounting block is in the described position on the saw.

An elongated cutter bar 90 provides inner and outer sides 91 and 92 and front and rear portions 93 and 94. The bar has an elongated slot 95 longitudinally extended inwardly from the rear edge thereof. The bar is positioned against the outer boss 86 of the mounting block 71 with this slot fitted over studs 87. The cutter bar also has an adjustment bore 96 in the outer side 92 and located adjacent to the studs 87, a peripheral edge 98, and a guiding groove 99 in said edge.

A small substantially rectangular adjustment plate 100 provides a pair of holes 101 fitted over the mounting studs 87 so that the plate rests against the outer side 92 of the cutter bar 90. The adjustment plate has an elongated recessed channel 102 in the surface thereof facing the cutter bar, and an elogated threaded adjustment rod 103 is positioned in the channel and rotatably mounted in the plate. A peg 104 is threadly received on the rod and is inwardly extended toward the cutter bar transversely of the rod and is releasably fitted into the bore 96 in the bar. Nuts 105 are screw-threaded on the studs and tightened inwardly against the plate for securely mounting the cutter bar on the mounting block 71. It will be noted that this arrangement also positions the cutter bar radially of the drive shaft 55.

A drive sprocket or wheel 110 is fitted over the mounting portion 59 of the drive shaft 55 and fixed against rotation relative to the drive shaft by a key 111 driven into keyways 112 and 113 in the sprocket and the drive shaft. A washer 114 is positioned between the sprocket and the bearing portion 58 of the drive shaft; a washer 115 is positioned on the drive shaft outwardly of the sprocket; and a nut 116 is screw-threadably received on the threaded end 60 of the drive shaft against the washer 115.

An endless saw chain 120 provides a plurality of connected links 121, a plurality of teeth 122 outwardly extended from the chain, and a plurality of guides 123 inwardly extended from the chain. The chain is positioned around the sprocket 110 and the cutter bar 90 so that the guides 123 are slidably received in the groove 99, the links 121 are in mesh with the sprocket, and the blades extend outwardly.

A gripper bar 125 having a plurality of gripper teeth thereon is secured to the inner side 72 of the front end portion 74 of the mounting block 71. The teeth are adapted to bite into timber being cut to steady the saw and to enable a leveraging effect for more effective cutting action.

*Operation*

The operation of the described embodiment of the present invention is believed to be readily apparent and is briefly summarized at this point. Initially it is to be understood that the saw chain 120 may be provided with its own drive shaft 55 or that the same drive shaft may be used for both the circular saw blade and the chain saw blade 120. It may be necessary to employ a slightly longer drive shaft for the attachment than is normally used for the circular saw. The attachment 70 of the present invention is connected to the circular saw 10 after the circular saw blade has been removed. With the shaft 55 in position, the bearing portion 58, the mounting portion 59, and the threaded end 60 are exposed.

Assuming that the attachment 70 is disassembled, that is, that the cutter bar 90 is not connected to the mounting block 71, the inner boss 77 of the mounting block 71 is then fitted into the pocket 30 and the apertures 78 aligned with the bores 34. The bolts 79 are then inserted and tightened so that the mounting block is rigidly held in forward, radial extension from the drive shaft 55.

Next, the cutter bar 90 is placed against the outer boss 86 with the mounting studs 87 extended through the slot 95. The holes 101 of the adjustment plate 100 are slipped over the studs, and the adjustment peg 104 fitted in the bore 96. The nuts 105 are then threaded on the studs and turned tightly down against the adjustment plate.

The sprocket 110 is then fitted over the drive shaft 55 and onto the mounting portion 59, the wedge 111 driven into place, the washer 115 placed on the shaft, and the nut 116 threaded onto the end 60 of the shaft.

The saw chain 120 is then placed around the sprocket 110 and the cutter bar 90 so that the links 121 are in mesh with the sprocket and the guides 123 are fitted in the groove 99. For this purpose the adjustment rod 103 is rotated to move the cutter bar toward the drive shaft 55. The peg 104 received in the bore 96 of the bar moves along the rod and in turn slides the cutter bar on the outer boss 86. This movement is accommodated and guided by the studs 87 received by the slot 95. After the chain has been positioned as described, the rod is rotated in an opposite direction to move the cutter bar radially outwardly of the shaft so that the chain cannot accidentally disengage from the sprocket and bar during operation.

In order to remove the attachment 70, it will be evident that a reverse procedure to that above described is followed. Thus, the conversion of the saw for use of saw chains in place of a circular saw blade may be accomplished in a matter of a few minutes.

It will be understood from the foregoing that a highly effective attachment for mounting saw chains on a circular saw in place of the circular saw blade thereof has been provided. The attachment obviates the need for having a separate circular saw and chain saw inasmuch as the same housing and motor may be employed for both types of blades. The advantages of economy and convenience make the attachment of the present invention a highly satisfactory and practical solution to the problem of dual use of hand saws of the type described.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a manually operable, portable power driven circular saw including a housing having an end; a motor mounted within the housing; a saw blade mounting shaft having driven connection to the motor and having an end extended from said end of the housing; a substantially semi-circular, transversely U-shaped guard having an inner flange mounted on said end of the housing and an outer flange in outwardly spaced relation to the inner flange, the flanges defining a saw blade receiving channel therebetween, said shaft being extended outwardly from the inner flange and being adapted to receive a circular saw blade thereon with a portion of said blade disposed within the channel of the guard and a portion extended from the guard for workpiece engagement; a drive sprocket mounted on the shaft for rotation therewith in a plane between the flanges of the guard; an elongated bar having a peripheral edge providing an edgewardly disposed groove; a mounting block borne by the housing adjacent to the shaft having an edge radially extended from the shaft, said mounting block having a forward portion in spaced relation to the housing and to the guard and having an oppositely disposed edge adjacent to the shaft and providing an outwardly disposed side inwardly spaced from the extended end of the shaft; spacing means between the forward portion of the block and the bar; screw-threaded fastening means releasably securing the block and the bar on the housing with the peripheral groove of the bar disposed in a plane normal to the shaft, disposed between the flanges of the guard, and transversely intersecting the sprocket; and a saw chain extended around the sprocket and the edge of the bar for circuitous travel around the bar incident to rotation of the sprocket.

2. A device as set forth in claim 1 in which the block is releasably rigidly secured to the housing, the spacing means is in the form of a boss rigid with the block and provides an outwardly disposed flat bar engaging surface, and the bar is mounted on the block for longitudinal adjustable movement engaged flatly against said surface of the spacing means.

3. A device as set forth in claim 1 in which the outer flange of the guard terminates in an arcuate edge radially outwardly spaced from the shaft and said oppositely disposed edge of the block adjacent to the shaft is spaced from the shaft a distance less than the radial spacing of the arcuate edge of the outer flange from the shaft.

4. In a manually operable, portable power driven circular saw including a housing having an open end; a channel-shaped semi-circular saw guard having an inner mounting flange secured to the housing and substantially covering the open end thereof, the inner flange having a central opening eccentrically communicating with the open end of the housing and terminating a a substantially diametrically extended edge, an outer flange in spaced parallel relation to the inner flange terminating in an arcuate edge radially outwardly spaced from the opening in the inner flange and from the diametric edge, and an arcuate peripheral portion rigidly interconnecting the inner and outer flanges in spaced relation to said opening; a motor mounted in the housing having a main drive shaft within the open end of the housing; an auxiliary drive shaft in spaced parallel relation to the main drive shaft having an inner end journaled in the housing in driven connection with the main drive shaft, an outer end extended from the housing through said opening in the inner flange providing a mounting portion substantially midway between said flanges adapted to mount a circular saw blade thereon with a portion of such blade disposed between the inner and outer flanges of the guard in adjacent peripherally spaced relation to said peripheral portion of the guard and with the remainder of said blade outwardly extended from the diametric edge of the saw guard and housing; an elongated mounting block having inner and outer sides, the inner side being disposed toward the inner flange of the guard and the outer side being spaced inwardly from the extended end of the auxiliary shaft, a forward edge extended substantially radially from the auxiliary shaft, a rearward edge adjacent to the auxiliary shaft, laterally disposed edges on opposite sides of the auxiliary shaft, and an outer boss outwardly extended from the outer side of the block adjacent to the forward edge thereof and in radially spaced relation to the auxiliary shaft; means releasably rigidly mounting the block on the housing; a drive sprocket mounted on the mounting portion of the auxiliary shaft for rotation therewith in a plane normal to the shaft intermediate the inner and outer flanges; an elongated cutter bar having a peripheral edge, an edgewardly disposed groove, forward and rearward ends, inner and outer sides and an elongated slot extended longitudinally of the rearward end of the bar; screw-threaded stud means extended through the slot of the bar and releasably interconnecting the bar and the block for slidable adjustable movement of the bar substantially radially of the auxiliary shaft and holding the bar against the outer boss of the block which serves to position the bar with the peripheral groove thereof in substantially the same plane as the sprocket; and a saw chain extended around the sprocket and the edge of the bar for circuitous travel around the bar incident to rotation of the sprocket.

5. In a manually operable, portable, power driven circular saw including an elongated substantially cylindrical wall having an open end; a channel-shaped circular saw guard having an inner substantially semi-circular mounting flange secured to said wall so as substantially to cover the open end thereof and having a central opening eccentrically communicating with the open end of the housing and terminating in a substantially diametrically extended edge, an outer flange in spaced parallel relation to the inner flange terminating in an arcuate edge radially outwardly spaced from the opening in the inner flange and from the diametric edge, and an arcuate intermediate flange rigidly interconnecting the inner and outer flanges substantially concentrically to said opening; a support secured to the inner flange and extended into the open end of the wall; a prime mover mounted in the wall having a main drive shaft extended within the open end of the wall; and an auxiliary drive shaft in spaced parallel relation to the main drive shaft, concentric to said opening, having an inner end journaled in said support and in driven connection with the main drive shaft, an outer end, a mounting portion substantially midway between said flanges, and a bearing portion extended toward the inner end from the mounting portion, the auxiliary shaft being adapted to mount a circular saw blade intermediate the inner and outer flanges of the guard in adjacent peripherally spaced relation to said intermediate flange and outwardly extended from said diametric edge of the saw guard and the wall and so that substantially half the saw is out of the guard at all times; the combination of an elongated substantially rectangular mounting block having inner and outer sides, an inner boss laterally protruding from the inner side and fitted in the opening in frictional engagement with said inner flange, a bore circumscribing the bearing portion of the auxiliary shaft, a forward end radially extended from the auxiliary shaft in flush engagement with said inner flange and terminating in an arcuate transverse forward edge spaced outwardly of the saw guard and the wall, a rear transverse edge closely adjacent to the auxiliary shaft, longitudinally extended edges on opposite sides of the auxiliary shaft, the distances between said rear edge and each of the longitudinal edges and the auxiliary shaft being less than the distance between said auxiliary shaft and the terminal edge of the outer flange thereby mounting the shaft without interference of the saw guard, an outer boss outwardly extended from the outer side of the block at the forward end thereof and in radially spaced relation to the auxiliary shaft, and a pair of studs rigidly outwardly extended from the outer boss in transverse alignment with the auxiliary shaft; means extended through the block into the support rigidly releasably securing the block in the opening in the inner flange; a bearing in the bore of the block rotatably journaling the auxiliary shaft therein; a drive sprocket fitted on the mounting portion of the auxiliary shaft for rotation therewith and being thereby positioned midway of said flanges; an elongated cutter bar having a peripheral edge, an edgwardly disposed groove, forward and rear ends, inner and outer sides, an elongated slot extended longitudinally of the bar inwardly from the rear end and slidably fitted on the studs so that the inner side of the bar is in flush engagement against the outer boss; means connected to the studs against the cutter bar for holding the latter in endward extension from the mounting block, the outer boss serving to position the groove of the bar in substantially the same plane as the sprocket; a saw chain extended around the sprocket and the edge of the bar for circuitous travel around the bar incident to rotation of the sprocket; and a timber engaging toothed gripper releasably connected to the forward end of the block.

References Cited in the file of this patent

UNITED STATES PATENTS

| | | |
|---|---|---|
| 1,618,341 | Howland | Feb. 22, 1927 |
| 2,348,588 | Arsneau | May 9, 1944 |
| 2,435,192 | Arsneau | Feb. 3, 1948 |
| 2,520,875 | Birchmeier | Aug. 29, 1950 |
| 2,578,097 | Soss | Dec. 11, 1951 |
| 2,612,915 | Moss | Oct. 7, 1952 |
| 2,755,826 | Kiekhaefer | July 24, 1956 |

FOREIGN PATENTS

| | | |
|---|---|---|
| 118,817 | Australia | Aug. 14, 1944 |